(12) United States Patent
Steffan et al.

(10) Patent No.: US 6,899,180 B2
(45) Date of Patent: May 31, 2005

(54) DOSING LANCE FOR POLYMERIZATION MATERIAL

(75) Inventors: Werner Steffan, Eichenbühl (DE); Peter Hagmann, Erlenbach am Main (DE); Renata Schröter, Lower Hutt (NZ)

(73) Assignee: Novartis AG, Basel (CH)

( * ) Notice: Subject to any disclaimer, the term of this patent is extended or adjusted under 35 U.S.C. 154(b) by 9 days.

(21) Appl. No.: 10/127,879

(22) Filed: Apr. 23, 2002

(65) Prior Publication Data

US 2002/0174883 A1 Nov. 28, 2002

(30) Foreign Application Priority Data

Apr. 24, 2001 (DE) ..................................... 201 07 040 U

(51) Int. Cl.⁷ .............................................. E21B 43/16
(52) U.S. Cl. ....................................... 166/370; 166/372
(58) Field of Search ................................ 166/370, 369, 166/372

(56) References Cited

U.S. PATENT DOCUMENTS

| | | | |
|---|---|---|---|
| 4,764,381 A | 8/1988 | Bodor et al. | 424/449 |
| 4,885,174 A | 12/1989 | Bodor et al. | 424/449 |
| 5,143,660 A | 9/1992 | Hamilton et al. | 264/1.4 |
| 5,508,317 A | 4/1996 | Muller | 522/85 |
| 5,573,108 A | 11/1996 | Hamilton et al. | 206/5.1 |
| 5,578,332 A | 11/1996 | Hamilton et al. | 425/555 |
| 6,367,555 B1 * | 4/2002 | Senyard et al. | 166/370 |

* cited by examiner

Primary Examiner—Hung Xuan Dang
(74) Attorney, Agent, or Firm—Karen A. Borrelli; Robert J. Gorman; R. Scott Meece

(57) ABSTRACT

The invention is concerned with the problem of ensuring optimum removal of flowable material from a container and, in particular, reducing the amount of material remaining in the container. This is achieved through a rigid, elongated, hollow basic element (2), the lower end region (3) of which can be placed on the bottom (7) of the container (6), and which has recesses (4) for removal of the flowable material.

3 Claims, 2 Drawing Sheets

DOSING LANCE FOR POLYMERIZATION MATERIAL

Figure 1:
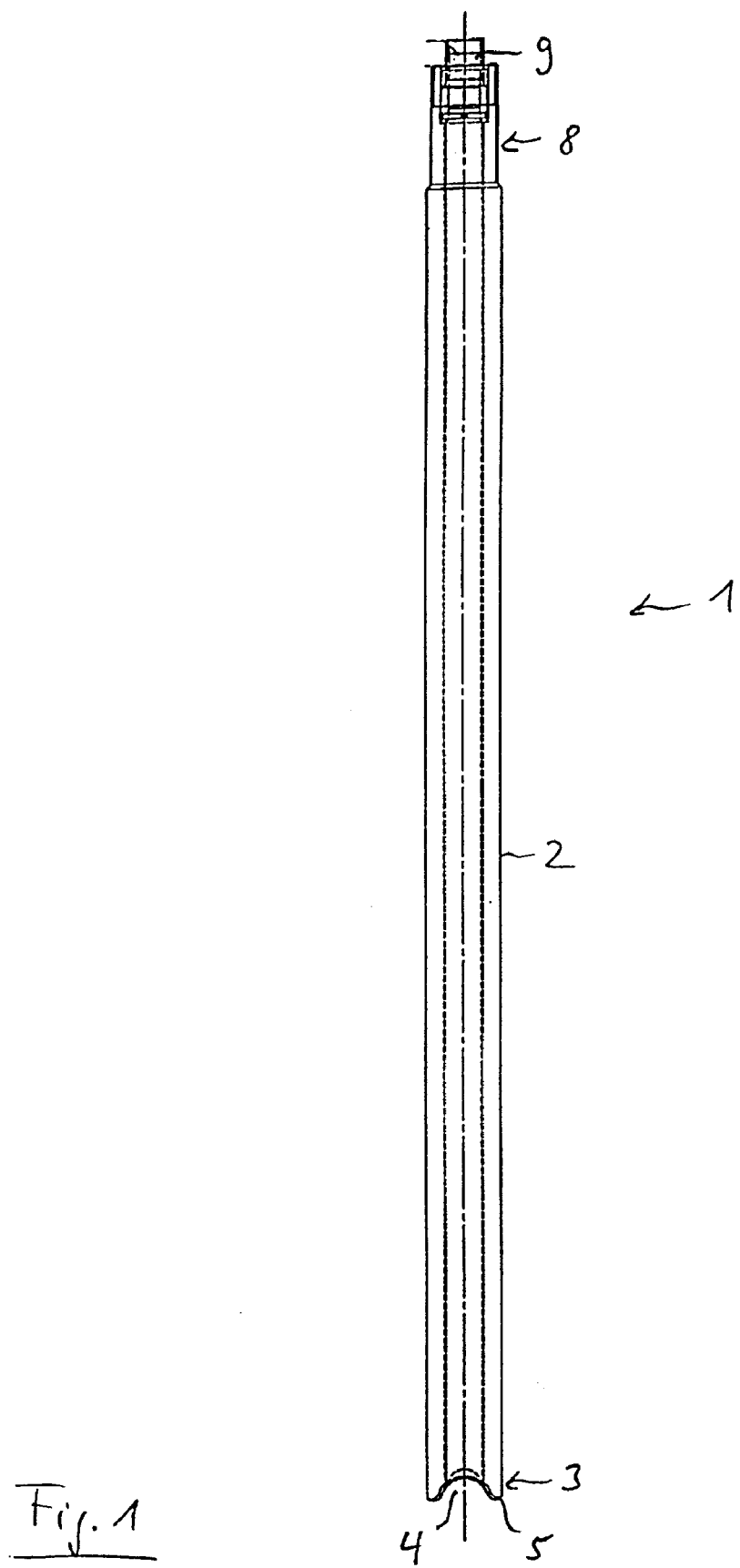

The invention relates to a dosing lance, especially for removing polymerisation material for contact lenses.

Contact lenses, which are to be manufactured economically in large unit numbers, are preferably manufactured by the so-called mould or full-mould process. In these processes, the lenses are manufactured into their final shape between two mould halves, so that there is no need to subsequently finish the surfaces of the lenses, nor to finish the edges. Mould processes are described for example in PCT patent application WO 87/04390 or in EP-A 0 367 513.

In these known mould processes, the geometry of the contact lens to be manufactured is defined by the mould cavity. The edge of the contact lens is likewise formed by the mould which normally consists of two mould halves. The geometry of the edge is defined by the contour of the two mould halves in the area in which they make contact. The contact lenses produced in this manner are moulded parts having little mechanical stability and a water content of more than 60% by weight. After manufacture, the lens is checked using measuring techniques, then packaged and subjected to heat sterilisation at 121° C. in an autoclave.

To manufacture a contact lens, first of all a certain amount of the flowable starting material is placed in the female mould half. Afterwards, the mould is closed by placing the male mould half thereon. Normally, a surplus of starting material is used, so that, when the mould is closed, the excess is expelled into an overflow area adjacent to the outer mould cavity. The subsequent polymerisation or crosslinking of the starting material takes place by radiation with UV light, or by heat action, or by another non-thermal method.

In U.S. Pat. No. 5,508,317, a new contact lens material is described, which is an important improvement in the chemistry of polymerisable starting materials for the manufacture of contact lenses. The patent discloses a water-soluble composition of a prepolymer, which is filled into the mould cavity and then crosslinked photochemically. Since the prepolymer has several crosslinkable groups, crosslinking is of particularly high quality, so that a finished lens of optical quality can be produced within a few seconds, without the necessity for subsequent extraction or finishing steps. Owing to the improved chemistry of the starting material as illustrated in the patent, contact lenses can be produced at considerably lower cost, so that in this way it is possible to produce disposable lenses.

The polymerisation material is flowable and is found in containers to which excess pressure has been applied. A flexible hose is inserted into the container and transports the material to the dispensing pumps. Of course, a substantial amount of residue remains in the container. In addition, the pumps occasionally run dry, even though sensors indicate that there is still sufficient material in the container, because the hose is flexible and does not touch the bottom of the container and therefore only the upper part of the container is emptied. Moreover, owing to this disadvantageous effect, air goes into the system, which then leads to undesired bubbles in the medium.

The invention is concerned with the problem of ensuring optimum removal of the polymerisation material from the container and, in particular, reducing the amount of material remaining in the container.

The invention solves this problem with the features indicated in claim 1. As far as further essential refinements are concerned, reference is made to the dependent claims.

The rigid, tube-like construction of the removal device ensures that the removal device touches the container bottom at a defined point, thereby avoiding disruption to the filling level. Furthermore, the recess on the opening to the removal device enables the residual amount to be reduced, since the lens material found in the bottom of the container can also be sucked through this opening.

Figure 2:
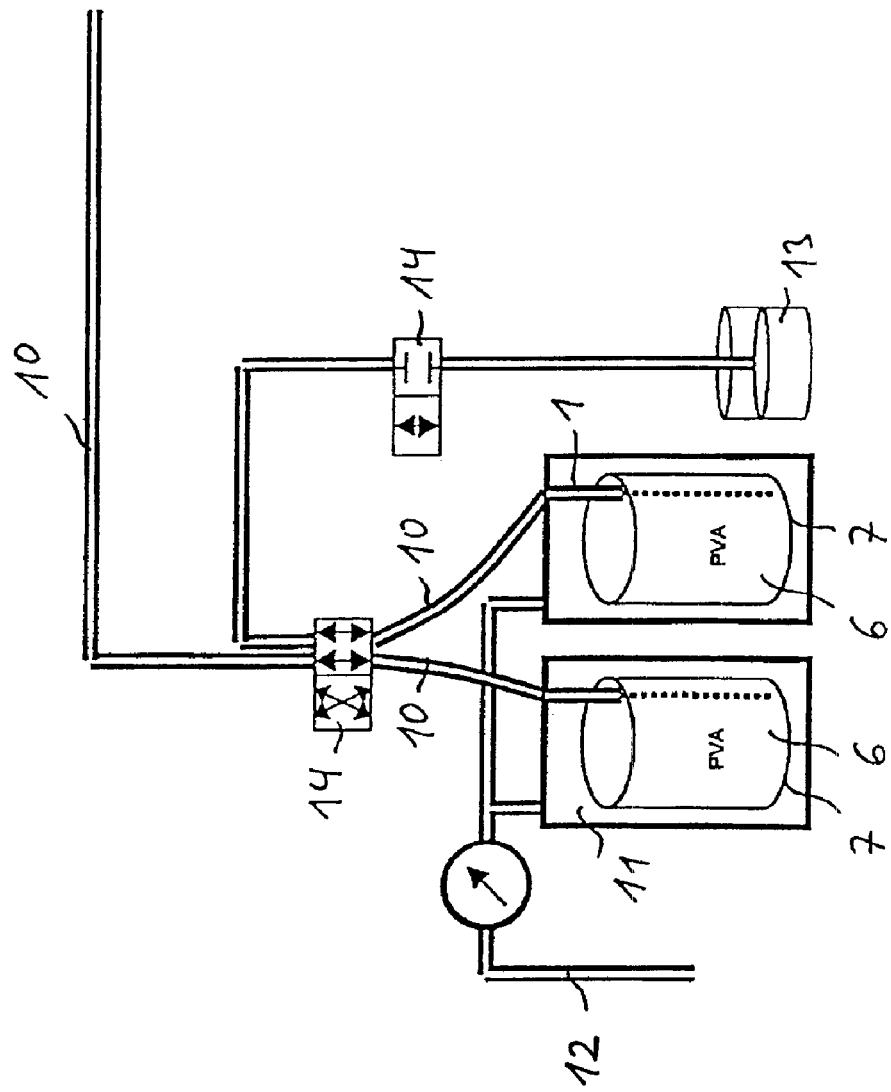

Further details and advantages of the invention may be seen from the description that follows and from the drawing. In the drawing, FIG. 1 shows a plan view of a removal device according to the invention;

FIG. 2 shows a schematic illustration of the assembly of the removal device in a pressure container filled with polymerisation material.

A removal device 1 illustrated in FIG. 1 is preferably made of one piece, and consists of a rigid, elongated, hollow basic element 2, which is suitably of cylindrical shape and has an opening at its end region 3. The removal device is preferably manufactured from a special plastic, in order to prevent any corrosion from appearing. This end region 3 preferably has two curved recesses 4, so that two lugs 5 are advantageously produced, which serve as mounting surfaces for the removal device 1. As is evident from FIG. 2, the removal device is at least sufficiently long for it to touch the bottom 7 of the container 6 when it is immersed in the container 6. The removal device 1 thereby stands on its lugs 5 on the bottom 7 of the container 6. In the upper end region 8, the removal device 1 has connecting pieces 9 for joining on to transfer hoses 10.

The containers 6 are filled with the polymerisation material. The containers 6 are surrounded by an outer container 11, which is connected to a nitrogen supply, so that compressed air can be applied to the containers 6. The outer container 11 has an aperture to receive the removal device, which is inserted into the aperture to such an extent that it touches the bottom of the container 6. The transfer hoses 10 are connected to pumps not illustrated here, which dose the polymerisation material into the female mould halves. In addition, a waste container 13 is advantageously provided for excess lens material, as well as valves 14 for regulating the required amount of material. Since the removal device is of rigid construction, it can rest in a defined position on the bottom of the container 6, thereby avoiding disruption to the filling level. The recess 4 at the opening of the removal device 1 enables the removal device to be lowered right to the bottom 7 of the container 6, and also thus enables the lens material found on the bottom 7 of the container to be drawn off. Over all, a reduction in the amount of residue is hereby attained. In addition, bubble-free removal of the polymerisation material from the container is thereby assured.

What is claimed is:

1. Removal device for removing polymerisation material from a container with a bottom, characterised by a rigid, elongated hollow basic element with an upper end region and a lower end region, a mounting surface adapted to be placed on the bottom of the container, and recesses for removing the polymerisation material.

2. Removal device according to claim 1, characterised in that the recesses are curved, and that lugs are formed between the recesses, which serve to mount the basic element.

3. Removal device according to claim 1, characterised in that the upper end region has connecting pieces.

* * * * *